Figure 1:
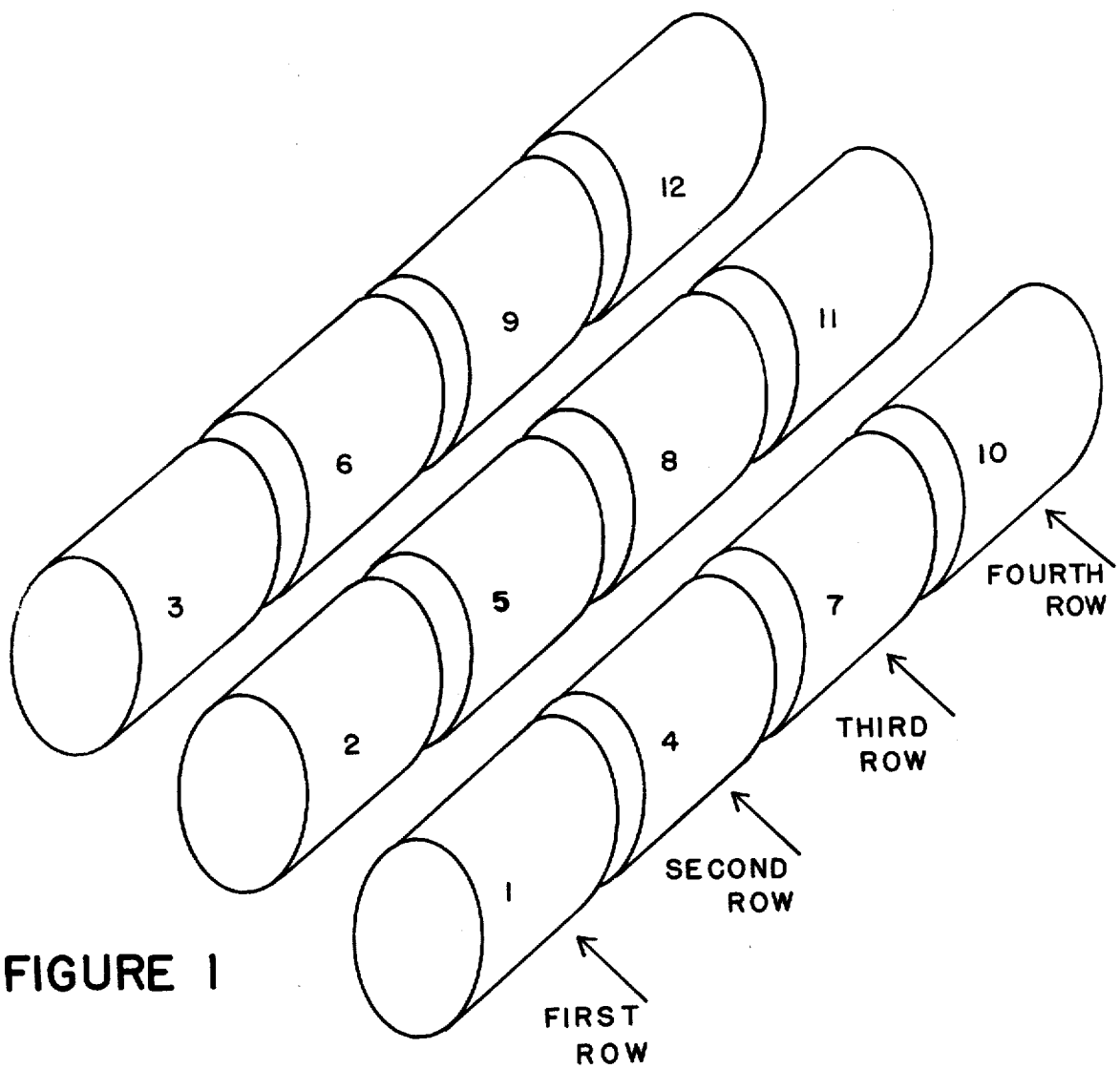

United States Patent [19]
Kehler

[11] 3,888,322
[45] June 10, 1975

[54] WHEELED BELLYLESS VEHICLE

[75] Inventor: Paul Kehler, South Bend, Ind.

[73] Assignee: Applied Inventions Corporation, North Tonawanda, N.Y.

[22] Filed: Nov. 29, 1973

[21] Appl. No.: 420,285

[52] U.S. Cl. ................................. 180/6.2; 180/20
[51] Int. Cl. ............................................ B62d 11/02
[58] Field of Search .......... 180/6.2, 20; 280/DIG. 7; 115/1 R; 404/122, 123

[56] References Cited
UNITED STATES PATENTS

| | | | |
|---|---|---|---|
| 1,102,443 | 7/1914 | Schamell | 404/123 |
| 3,023,826 | 3/1962 | Larson et al. | 280/DIG. 7 |
| 3,036,842 | 5/1962 | Elliott et al. | 280/DIG. 7 |
| 3,204,713 | 9/1965 | Shanahan | 115/1 R |
| 3,316,992 | 5/1967 | Schindler | 180/6.2 |
| 3,452,702 | 7/1969 | Slemmons | 115/1 R |

FOREIGN PATENTS OR APPLICATIONS

| | | | |
|---|---|---|---|
| 87,487 | 1/1957 | Denmark | 180/20 |
| 885,638 | 12/1961 | United Kingdom | 404/122 |
| 692,750 | 8/1965 | Italy | 115/1 R |

*Primary Examiner*—David Schonberg
*Assistant Examiner*—John A. Pekar

[57] ABSTRACT

A power driven vehicle having a plurality of powered ground engaging wheels suspended below the vehicle and substantially covering the whole underside of the vehicle, where the wheels are operably connected into separate rows that extend along the length of the vehicle, with drive means applied to each row of wheels in such a manner that the two outer rows of wheels are driven at the proper speed required for an intended maneuver, and the inner rows of wheels are driven at a speed that is intermediate the speeds of its two adjacent rows of wheels.

2 Claims, 8 Drawing Figures

WHEELED BELLYLESS VEHICLE

This invention deals with a vehicle that is designed to operate over extremely soft ground such as found in the tundra during summer months. Only vehicles having very low ground pressure can operate on such terrain. It is obvious that vehicles with powered running gear extending over the whole underside of the vehicle, which can be referred to as "bellyless vehicles", have the lowest possible ground pressure and therefore are most suitable for operation on soft terrain. The only such vehicles known to the public employ endless tracks for their running gear (U.S. Pat. Nos. 1,749,276, 3,371,733 and 3,456,750).

By the nature of their design, trac suspension systems are rather rigid and unable to conform to small scale contours of the ground. When a tracked bellyless vehicle moves over a contour or obstacle that is small in comparison to the dimension of the vehicle, the load of the vehicle is not always distributed evenly over all tracks. Unequal distribution of the load over the tracks can cause damage to the excessively loaded tracks as well as to the underlying terrain. Small tracked bellyless vehicles can avoid such situations by maneuvering around small obstacles and ground contours. Large vehicles, as used for the transportation of oil well drilling equipment, for example, can not easily maneuver around obstacles and ground contours. Endless tracks, therefore, are not very suitable for use as running gear for extremely large bellyless vehicles.

The present invention eliminates the problems caused by the rigidity of tracks, by using wheels as the running gear for bellyless vehicles. Large, low - pressure all-terrain tires were shown to be able to operate over the tundra without causing ecological damage. Bellyless vehicles employing such tires have a twofold advantage over vehicles employing tracks:

First of all, the low-pressure all-terrain tires are more resilient than tracks and can roll over obstacles that are small in comparison to the tire size, without significant increase of the tire pressure.

Secondly, if the wheels are not mounted rigidly to the vehicle but are allowed to move up against a spring force, individual wheels can climb over obstacles comparable in size to the size of their tires, without transfering the whole vertical motion of the wheel to the vehicle frame. These two features allow for much smoother operation of large wheeled bellyless vehicles over contoured terrain, when compared to the operation of large tracked bellyless vehicles.

The main object of the invention is to provide a method of driving a multiplicity of wheels that are suspended below an entire all-terrain vehicle, making the vehicle bellyless.

Another object of the present invention is to provide means of suspending the wheels under the vehicle in a manner that allows the wheels to climb over small obstacles.

Figure 2:
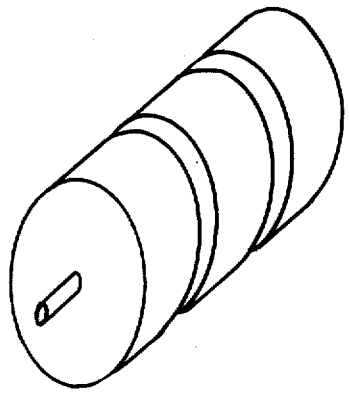
Figure 3:
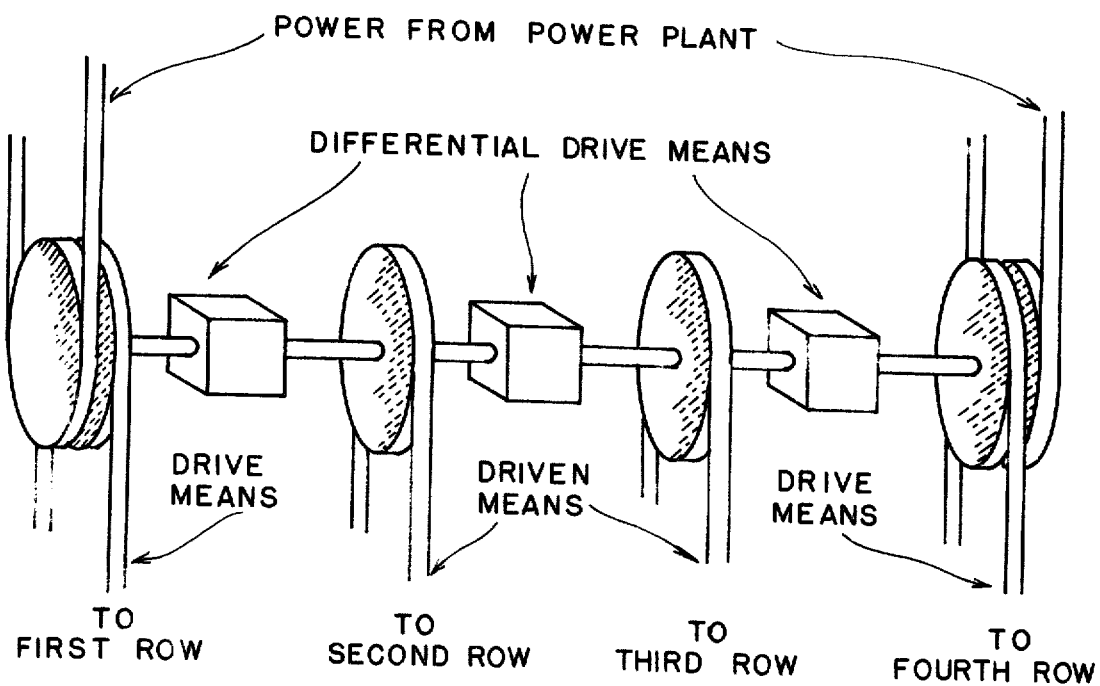
Figure 4:
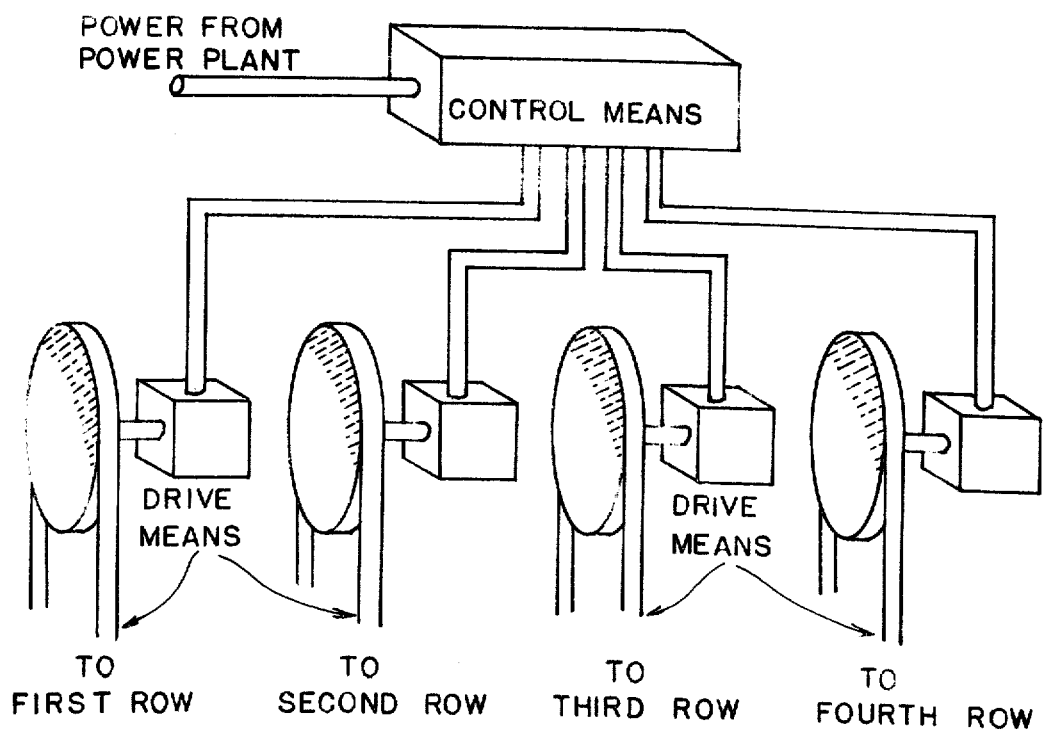
Figure 5:
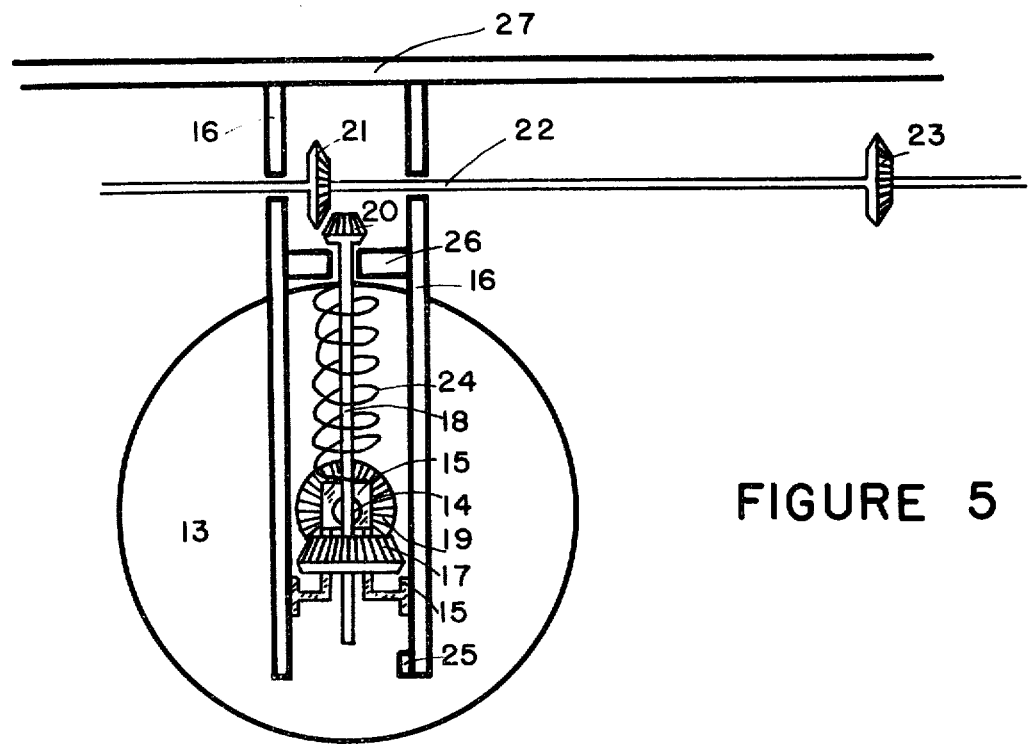
Figure 6:
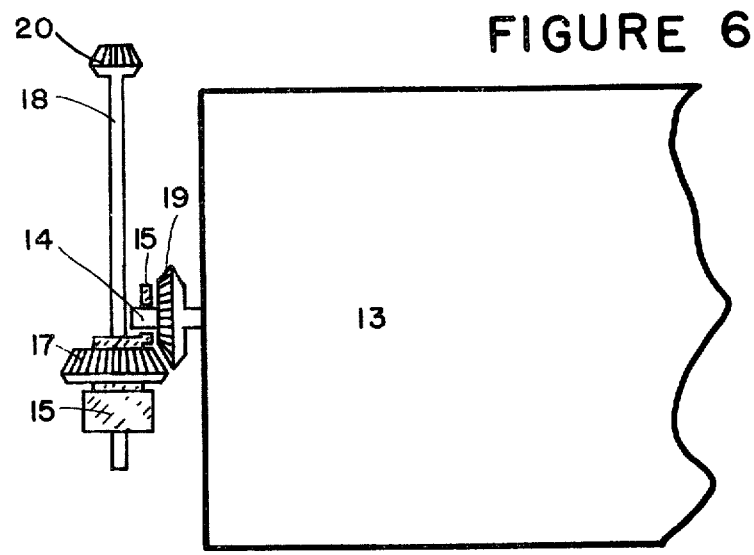
Figure 7:
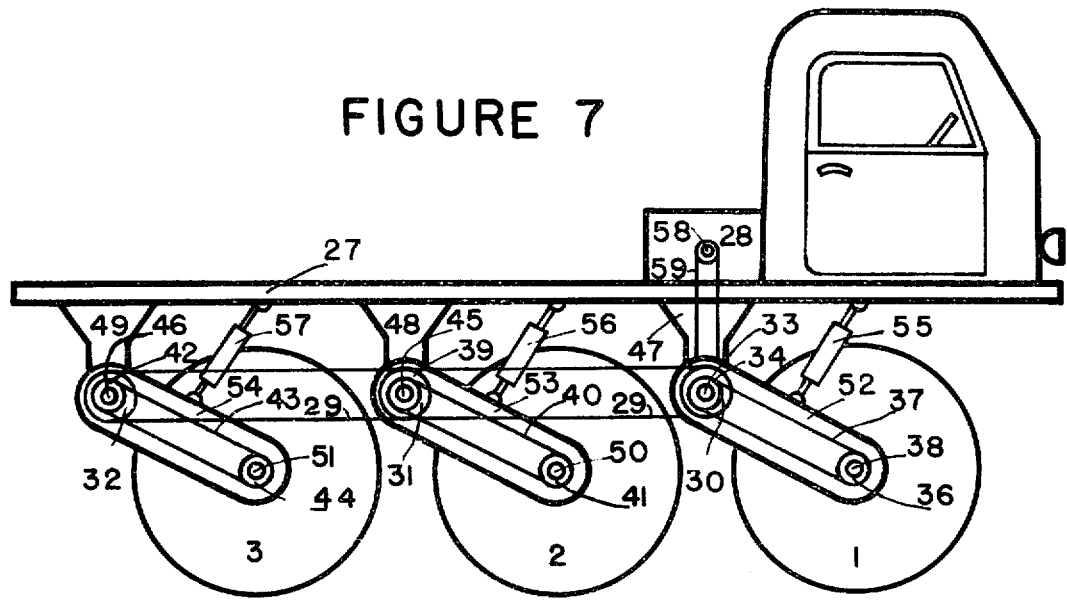
Figure 8:
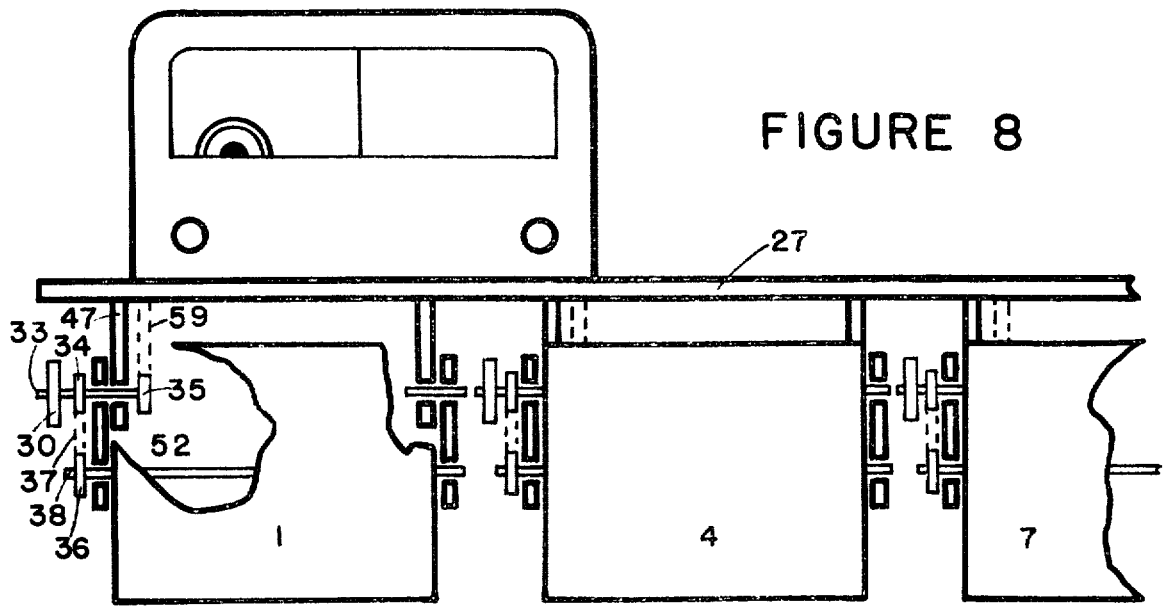

The novel features which I believe to be characteristic of this invention are set forth in the appended claims. The principles of the invention, however, are best understood from the following description of specific embodiments of the invention, read in connection with the accompanying drawings, in which:

FIG. 1 depicts the relative position of twelve wheels mounted with low-pressure all-terrain tires and used as running gear of a wheeled bellyless vehicle, FIG. 2 shows a possible replacement of one or more of the wheels mounted with wide all-terrain tires as shown in FIG. 1 by three narrower rims which are rigidly attached to one common axle and on which are mounted three relatively narrow tires, FIG. 3 shows the block diagram of a skid steering system usable for the wheels bellyless vehicle, comprising drive means that are powering the outer rows of wheels, driven means that are powering the inner rows of wheels, and differential drive means that apply power to the driven means, FIG. 4 shows the block diagram of a skid steering system usable for the wheeled bellyless vehicle, comprising a control means that distributes power to the four independent drive means powering the inner and outer rows of wheels, FIG. 5 is the side elevation of a wheel suspension means that allows vertical motion of the wheel, FIG. 6 is a partial front elevation of the wheel suspension means shown in FIG. 5, FIG. 7 is the side elevation of a wheeled bellyless vehicle, and FIG. 8 is a partial front elevation of the wheeled bellyless vehicle shown in FIG. 7.

Reference will now be made by using numerals which designate corresponding parts shown in the FIGS. 1 to 8.

The wheeled bellyless vehicle described in this specification has wheels 1 to 12 arranged on its underside, with low-pressure, wide all-terrain tires mounted on each of these wheels. The relative location of these wheels 1 to 12 is shown in FIG. 1. The wheels are grouped into four rows of wheels, the first row combining the wheels 1, 2 and 3, the second row combining the wheels 4, 5 and 6, the third row combining the wheels 7, 8 and 9, and the fourth row combining the wheels 10, 11 and 12. The first and fourth rows of wheels will be referred to as the outer rows of wheels in this specification, whereas the second and third rows of wheels will be referred to as the inner rows of wheels.

The four rows of wheels shown in FIG. 1, each row containing three wheels, were chosen for illustrative purposes only. Without violating the principles disclosed by this invention, wheeled bellyless vehicles having more (or less) than four rows of wheels can be built, with the minimum number of rows being three, and each row of wheels can have more (or less) than three wheels, with the minimum number of wheels in a row being two.

Since skid steering is used for the maneuvering of the wheeled bellyless vehicle described in this specification, it is desirable that the vehicle has as small a length to width ratio as possible. A wheeled bellyless vehicle designed for operation in the wide spaces of the tundra, therefore, will preferably be more wide than long.

Each one of the wide-rimmed wheels mounted with wide all-terrain tires can be replaced by a set of several wheels, mounted with relatively narrow tires, as shown in FIG. 2 for three wheels. Sets of narrow wheels as shown in FIG. 2 can then be grouped into rows of wheels as shown in FIG. 1, without charging the operational principle of the bellyless vehicle.

The wheels in each row of wheels are operably connected in a manner that allows only simultaneous rotation of all wheels and only rotation at the same speed. The connecting means, not an object of this invention, can be a chain, a shaft and gear system, or a hydraulic or electric coupling, as long as it causes all wheels in each row to rotate at the same speed.

Maneuvering of wheeled bellyless vehicles is accomplished by skid steering:

For straight forward or backward motion, power is applied to the two outer rows of wheels at the same rate, which makes the wheels in these rows rotate at the same speed and in the same direction. For slow turns of the vehicle, power is applied to the two outer rows at different rates, which makes the wheels in each of the two outer rows rotate in the same direction but at different speeds. For on-the-spot turns of the vehicle, the two outer rows are powered to move at the same speed but in opposite directions. In each of the maneuvers described above, the wheels of the inner rows rotate at a speed that is intermediate the speeds of the wheels in the two adjacent rows.

Many means are available to accomplish proper skid steering of wheeled bellyless vehicles. In purely mechanical skid steering systems, power from the power plant is applied directly to the drive means powering the two outer rows of wheels, as illustrated diagrammatically in FIG. 3. The two inner rows in FIG. 3, the second and the third row, are powered by driven means which are powered by differential drive means. The differential drive means can be sets of differentials operably connected to the connecting means of each row (similar to the differentials described in U.S. Pat. No. 3,371,733), or they can be sets of differentials mounted separately from the wheels and the connecting means (similar to the differentials described in U.S. Pat. No. 3,456,750). In the block diagram of FIG. 3, the differential drive means are sets of differentials mounted in special gear boxes, separate from the wheels and the connecting means.

Hydraulic or electric drive systems can also be utilized for the powering and the skid steering of wheeled bellyless vehicles. FIG. 4 illustrates diagrammatically such a hydraulic or electric drive system, in which the power is applied directly and separately to the drive means powering each one of the four rows of wheels and in which the rate of application of power to each row (and with it, the rotational speed of the wheels in each row) is controlled by a central control means.

When the wheels of a wheeled bellyless vehicle are attached directly to the frame of the vehicle, the wheeled vehicle has only a small advantage over tracked vehicles when the smoothness of ride over obstacles is compared. The major advantage of a wheeled vehicle is the fact that each of its wheels can be attached to it in a manner that allows for vertical motion of its powered wheels in respect to the frame of the vehicle. The FIGS. 5 and 6 show one possible way of mounting the wheels in a manner that permits vertical motion. In these Figures, a wheel on which is mounted the tire 13, is attached to the axle 14 which is rotatably supported on one end by the slide 15. The slide 15 is capable of sliding up and down a frame 16 which is rigidly attached to the body 27 of the vehicle. A bevel gear 17, having a hole through its center, is mounted on the slide 15. A shaft 18 passes through the center hole of the bevel gear 17. When the slide 15 moves up and down the frame 16, the bevel gear 17 is freely moving up and down the shaft 18. Although the bevel gear can move lengthwise along the shaft, it is not free to rotate around the shaft. A key way extending along the shaft 18 guides a key on the bevel gear 17 and maintains the angular position between the shaft 18 and the bevel gear 17, independent of the vertical position of the bevel gear 17.

The bevel gear 17 engages the bevel gear 19 which is rigidly mounted on the shaft 14. Thus, rotation of the shaft 18 will cause rotation of the bevel gear 17, rotation of the bevel gear 19, rotation of the shaft 14 and rotation of the wheel 13.

The upper end of the shaft 18 is attached to the bevel gear 20 which engages the bevel gear 21. Bevel gear 21 is rigidly attached to the shaft 22, to which is also attached the bevel gear 23 and other bevel gears. Bevel gear 23 is driving another wheel in a manner that is identical to the manner shown for wheel 13 in the FIGS. 5 and 6. The other bevel gears attached to the shaft 22 drive other wheels, and the shaft 22, therefore, can be considered to be the connecting means through which all wheels in one row of wheels of the wheeled bellyless vehicle are connected. It is obvious that rotation of the shaft 22 will cause rotation of the bevel gear 21, rotation of the bevel gear 20, rotation of the shaft 18 and finally rotation of the wheel 13. The other wheels in the row of wheels driven by the connecting means, the shaft 22, will rotate at the same speed as the wheel 13.

A spring 24 is mounted between the slide 15 and a crossmember 26 which is attached between the two members of the frame 16. When in fully extended position, the spring 24 is pushing the slide 15 against a stop 25 which is also mounted on the frame 16. The weight of the vehicle, however, compresses the spring and the slide 15 moves up relative to the frame 16. Whenever the wheel 13 moves over a small obstacle that is not effecting the other wheels of the vehicle, the slide 15 is pushed up further and the spring 24 is compressed further.

Another way of mounting wheels to allow for vertical motion of the wheels is shown in the FIGS. 7 and 8, which are a side elevation and a partial front elevation of an embodiment of the invention. The wheeled bellyless vehicle shown in these two Figures consists of a body 27 to which is attched a crew cabin and a power plant and gear box 28. The running gear of this vehicle comprises the wheels 1 to 12 shown in FIG. 1. The connecting means that groups the wheels 1, 2 and 3 into the first row of wheels is the chain 29.

The chain 29 drives the sprockets 30, 31 and 32. Sprocket 30 is mounted on shaft 33 which also carries the sprockets 34 and 35. The sprocket 34 drives sprocket 36 by the chain 37. The sprocket 36 is attached to the axle 38 which is attached to the wheel 1.

In a similar manner, sprocket 31 drives wheel 2 through the sprocket 39, the chain 40 and the sprocket 41, and the sprocket 32 drives the wheel 3 through the sprockets 42, the chain 43 and the sprocket 44.

The axles 33, 45 and 46 are rigidly mounted on the support structures 47, 48 and 49 which are rigidly attached in a fixed position relative to the body 27. Therefore, the chain 29 which connects to the sprockets 30, 31 and 32 which are mounted on the axles 33, 45 and 46, is also always in a fixed position relative to the body 27. Although the chain 29, the connecting means of the wheels 1, 2 and 3 is always in a fixed position relative to the body 27 of the vehicle, the individual wheels 1, 2 and 3 are not in a fixed position relative to the body 27. Instead, they can move upward and thus climb over small obstacles. This upward motion is made possible by mounting the axles 38, 50 and 51, which support the wheels 1, 2 and 3, at the moveable ends of the rotatable beams 52, 53 and 54. These rotatable beams are rotatably mounted on the axles 33, 45 and 46 and are held in position by the springs and shock absorbers 55, 56 and 57.

The chain 29, being the connecting means of the first row of wheels which contains the wheels 1, 2 and 3, is powered by the sprocket 58 which is connected to the sprocket 35 through the chain 59. Sprocket 35 is mounted on the same shaft 33 with sprocket 30, which engages with and drives the chain 29.

The second row of wheels (containing the wheels 4, 5 and 6), the third row of wheels (containing the wheels 7, 8 and 9) and the fourth row of wheels (containing the wheels 10, 11 and 12) are driven similarly to the illustrated first row of wheels (containing the wheels 1, 2 and 3), by sprockets mounted on the power plant and gear box 28, similar to the sprocket 58. The FIGS. 3 and 4 show that there are many ways in which the individual sprockets, driving the individual rows of wheels, can be powered differentially to move at a speed that is just right for the intended maneuver of the wheeled bellyless vehicle.

The preceding description and the FIGS. 1 to 8 show how a vehicle could be designed that has its whole underside covered by powered wheels, these wheels being grouped into individual rows of wheels and extending along the length of the vehicle, and with these rows of wheels being powered individually with differential speeds that correspond to the desired maneuver: each inner row of wheels moves at a speed that is intermediate the speeds of the two rows of wheels adjacent to it. Although specific embodiments of the invention have been illustrated and described, it is understood that various alterations in the details of construction can be made without departing from the scope of the invention which is indicated in the appended claims.

I claim:

1. A vehicle comprising a main body,
 a multiplicity of powered wheels that cover substantially the whole underside of said vehicle and that are operably connected into two outer rows of wheels that extend along the two sides of said vehicle and one or more inner rows of wheels that are positioned between said outer rows of wheels,
 drive means for individually driving said outer rows of wheels and said inner rows of wheels,
 and control means for transmitting power to said drive means and for selectively causing said outer rows of wheels to rotate in the same or in opposite directions at the same or at different speeds and (causing) said inner rows of wheels to rotate at a speed that is intermediate the speeds of its two adjacent rows of wheels when said outer rows of wheels are driven at different speeds.

2. A vehicle comprising a main body,
 a multiplicity of powered wheels that cover substantially the Whole underside of said vehicle and that are operably connected into two outer rows of wheels that extend along the two sides of said vehicle and one or more inner rows of wheels that are positioned between said outer rows of wheels,
 drive means for individually driving said outer rows of wheels in the same or in opposite directions at the same or at different speeds,
 driven means for driving said inner rows of wheels,
 and differential drive means for transmitting power from said outer rows of wheels to said driven means of said inner rows of wheels for causing said inner rows of wheels to rotate at a speed that is intermediate the speeds of its two adjacent rows of wheels when said outer rows of wheels are driven at different speeds.

* * * * *